(12) United States Patent
Takenaka et al.

(10) Patent No.: US 6,723,759 B2
(45) Date of Patent: Apr. 20, 2004

(54) RECYCLED RESIN COMPOSITION AND METHOD FOR PRODUCING THE SAME

(75) Inventors: Kunihiro Takenaka, Hiratsuka (JP);
Tsutomu Yonekura, Hiratsuka (JP);
Toshiyuki Furuya, Hiratsuka (JP);
Shigeru Muramatsu, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 09/567,100

(22) Filed: May 8, 2000

(65) Prior Publication Data

US 2003/0009008 A1 Jan. 9, 2003

(30) Foreign Application Priority Data

May 7, 1999 (JP) ............................................ 11-127720

(51) Int. Cl.$^7$ ................................................. C08J 11/04
(52) U.S. Cl. ........................ 521/40.5; 521/45.5; 521/46; 521/46.5; 521/47; 521/48; 521/49
(58) Field of Search ............................... 521/40.5, 45.5, 521/46, 46.5, 47, 48, 49

(56) References Cited

U.S. PATENT DOCUMENTS 5,026,512 A * 6/1991 Chang ........................ 264/40.6
5,330,596 A * 7/1994 Gusavage et al. ............. 156/78

* cited by examiner

Primary Examiner—Katarzyna Wyrozebski Lee
(74) Attorney, Agent, or Firm—Sughrue Mion, PLLC

(57) ABSTRACT

Disclosed is a recycled resin composition having physical properties, a feeding property as well as a moldability which are by no means inferior as compared with the raw material resin composition, even when a ratio of recycled material in recycled resin composition used as molding material is increased. A recycled resin composition obtained by compounding a mixture containing (a) a raw material resin, (b) at least one kind of additives for resin, and (c) a pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin, is provided.

24 Claims, 1 Drawing Sheet

<u>One example of a flow of recycling</u>

RECYCLED RESIN COMPOSITION AND METHOD FOR PRODUCING THE SAME

FIELD OF THE INVENTION

The present invention relates to a recycled resin composition, more specifically, to a recycled resin composition effectually utilizing pulverized materials made from a recovered molded article such as sprues or runners generated especially at the time of producing molded products and to a method for producing the recycled resin compositions.

BACKGROUND OF INVENTION

Thermoplastic resins are widely used since they have various excellent properties such as moldability, electrical insulation property, mechanical property or the like. One of the advantages of the thermoplastic resins is that material can be efficiently used. Other molded articles (also referred to as recovered molded articles) than final products, such as sprues, runners or any molded products which does not satisfy specifications (off specifications), are generated at the time of producing products by injection molding.

In recent years, various types of products have become smaller and lighter, and parts (molded products) used in such products have also become smaller. Therefore, resin compositions having an excellent mold ability are widely utilized in such parts, many of which are small and thin. In the case of producing such small parts (molded products), a weight ratio of sprue and runner in the total weight of the molded product is large. If recovered molded articles such as sprue or runner are discarded, a yield efficiency of raw material resin compositions becomes lower. Therefore, the recovered molded articles are pulverized to be a pulverized material (referred to as a recycled material) without being discarded. This recycled material and a raw material resin composition pellet (virgin pellet) maybe simply mixed and be subjected to injection molding. However, the molded product obtained from such a resin mixture suffers from degradation of physical properties such as the mechanical property, flame-retardant property or the like, and causes various problems such as defective feeding to a molding apparatus.

One reason for degradation of physical properties includes that pulverized materials contains much powder and the size of granules is unequal to the pellets of the raw material resin compositions. The pulverized materials (a recycled material) may be melted, kneaded, extruded and cut to be re-pelletized in an extruder, and then may be blended with a virgin pellet and subjected to injection molding, but the thermal decomposition, degradation, change of properties of the material can not be avoided, and the degradation of the physical properties of the molded products can not be avoided.

SUMMARY OF THE INVENTION

It is an object of the present invention to provide a recycled resin composition having physical properties, a feeding property and a moldability which are comparative with the raw material resin composition, even when a ratio of recycled material in the recycled resin composition used as molding material is increased.

The present inventors have been diligently studied to accomplish the above-mentioned object, and as a result, they have found that a recycled resin composition obtained by compounding a raw material resin, at least one kind of additives for resin, and a pulverized material of a recovered molded article such as sprue or runner generated at the time of producing molded products from a raw material resin composition and/or a recycled resin composition, have almost the same performance as that of a raw material resin composition made from a raw material resin and additives for resin. The present invention has been completed on the basis of these findings.

According to the present invention, there is provided a recycled resin composition obtained by compounding a mixture containing (a) a raw material resin, (b) at least one kind of additives for resin, and (c) a pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin.

Preferably, the recycled resin composition of the present invention is in a pelletized form which is obtained by compounding the mixture in an extruder, etc, and cutting the mixture.

Preferably, the recycled resin composition of the present invention has a composition substantially the same as that of (c) a pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin. Preferably, the raw material resin composition composed of (a) the raw material resin and (b) at least one kind of the additives for resin has a composition substantially the same as that of (c) the pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin.

Preferably, the recycled resin composition of the present invention is obtained by compounding the mixture containing 25 to 95 parts by weight of a total amount of (a) the raw material resin and (b) at least one kind of the additives for resin, and 75 to 5 parts by weight of (c) the pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin.

Preferably, (a) the raw material resin is one resin or a mixture of two or more resins which are selected from a group consisting of polyester resin, polycarbonate resin, polyamide resin, polyoxymethylene resin, polyphenylene ether resin, polyolefin resin, polystyrene based resin, and polyphenylene sulfide resin.

Preferably, the recycled resin composition of the present invention comprises a glass fiber as one kind of (b) the additives for resin.

Preferably, (c) the pulverized material has a particle size of 0.1 to 50 mm, more preferably 0.2 to 30 mm, and even more preferably 0.3 to 25 mm. If the particle size is too large or too small, the blending of the pulverized material and the raw material resin composition becomes difficult, and the defective feeding tends to occur, and it is not preferred.

When the recycled resin composition according to the present invention comprises a glass fiber as one kind of (b)

the additives for resin, (c) the pulverized material preferably has a particle size of 0.5 to 50 mm, more preferably 0.7–30 mm, and even more preferably 1–25 mm.

Preferably, a breaking strength of the molded product made from the recycled resin composition is 80% or higher, more preferably 90% or higher of that of a molded product made from the raw material resin composition.

Preferably, an elongation at break of the molded product made from the recycled resin composition is 80% or higher, more preferably 90% or higher of that of a molded product made from the raw material resin composition.

Preferably, a flexural strength of the molded product made from the recycled resin composition is 80% or higher, more preferably 90% or higher of that of a molded product made from the raw material resin composition.

Preferably, a flexural modulus inelasticity of the molded product made from the recycled resin composition is 80% or higher, more preferably 90% or higher, particularly preferably 95% or higher of that of a molded product made from the raw material resin composition.

Preferably, a flammability (Flame class), prescribed in UL 94, of the molded product made from the recycled resin composition is substantially similar with that of a molded product made from the raw material resin composition.

According another aspect of the present invention, there is provided a molded product produced from the recycled resin composition of the present invention.

According to further aspect of the present invention, there is provided a method for producing the recycled resin composition of the present invention, which comprises a step of compounding the mixture containing (a) a raw material resin, (b) at least one kind of the additives for resin, and (c) a pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin.

In the method for producing the recycled resin composition of the present invention, the recycled resin composition preferably has a composition substantially the same as that of (c) the pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin, and a raw material resin composition composed of (a) the raw material resin and (b) said at least one kind of the additives for resin preferably has a composition substantially the same as that of (c) the pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin.

According to still further aspect of the present invention, there is provided a method for recycling a resin which comprises the steps of: collecting (c) a pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin, and compounding a mixture containing (a) a raw material resin, (b) at least one kind of the additives for resin, and (c) the thus collected pulverized material to produce a recycled resin composition.

BRIEF DESCRIPTION OF THE DRAWINGS

Various other objects, features and advantages of the present invention will become more fully appreciated as the same becomes better understood when considered in conjunction with the accompanying drawings wherein.

DETAILED DESCRIPTION OF THE INVENTION

Figure 1:
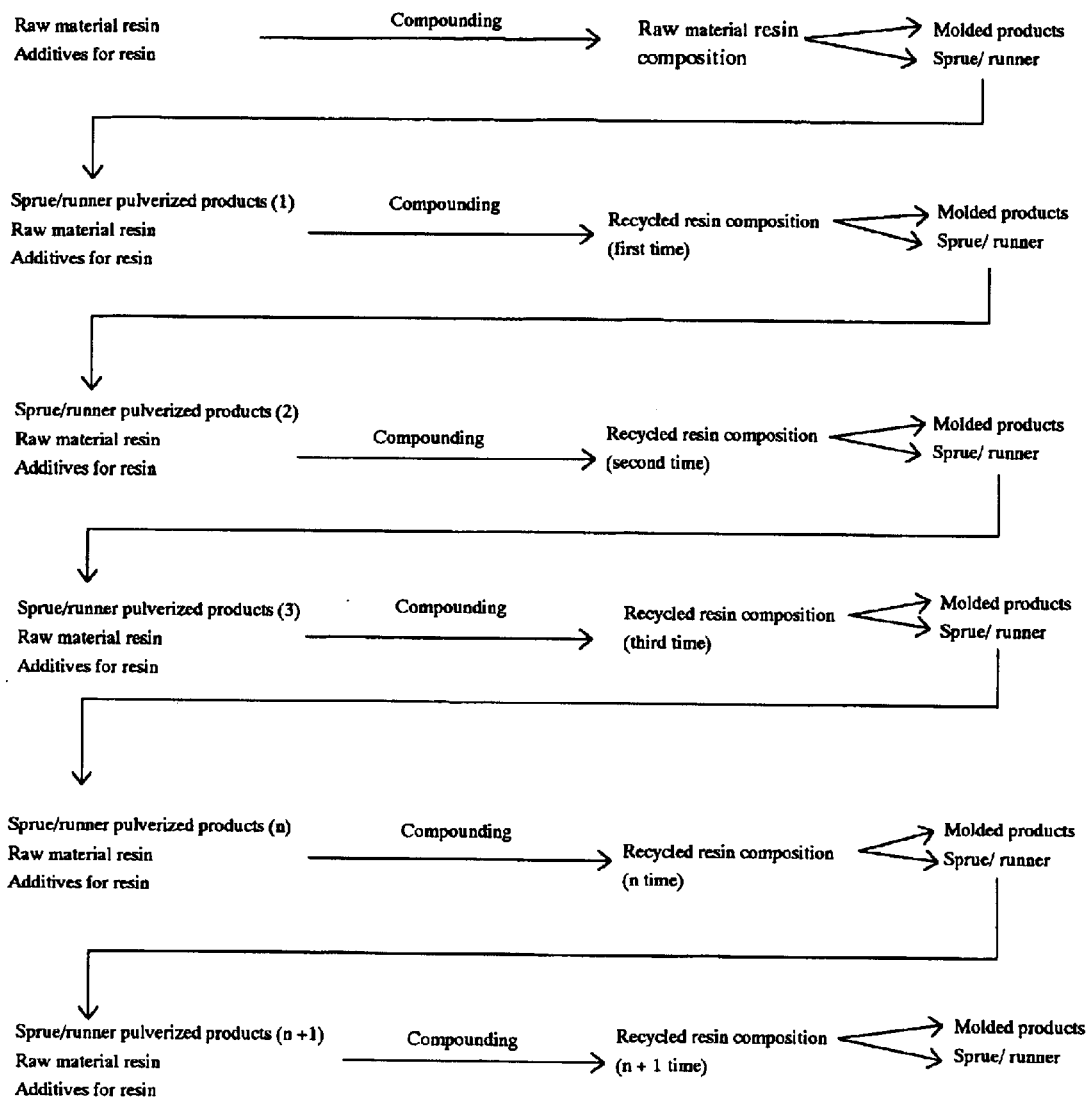
FIG. 1 is a flow chart showing one example of production of the recycled resin composition of the present invention.

The present invention will be hereinafter described in detail.

The recycled resin composition of the present invention is composed of (a) a raw material resin, (b) at least one kind of additives for resin, and (c) a pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin. Each of these components will be described thereinafter.

(a) Raw Material Resin

The term "raw material resin" used herein means an unmolded (virgin) resin.

The raw material resin used in the present invention is not especially limited so long as it can used for producing molded products by injection molding, extrusion molding, compression molding or the like. Examples of the raw material resins include, but not limited to, a thermoplastic resin such as polyester resin, polycarbonate resin, polyamide resin, polyoxymethylene resin, polyphenylene ether resin, polyolefin resin, polystyrene based resin, polyphenylene sulfide resin, as well as polymer blend there of and polymer alloy thereof. These resins may be homopolymer or copolymer. As the raw material resin, one type of the resin may be used alone, or a mixture of two or more resins can be used in combination.

Example of polyester resin includes a resin composed of a condensation polymer of dicarboxylic acid or its lower alkyl ester component and glycol component. The dicarboxylic acid unit consists of one type, or two or more types selected from: aromatic dicarboxylic acid such as terephthalic acid, phthalic acid, isophthalic acid, 4,4,'. diphenyldicarboxylic acid, 4,4'.diphenoxyethanedicarboxylic acid, 4,4'.diphenyletherdicarboxylic acid, 4,4'-diphenylsulfonedicarboxylic acid, 2,6. naphthalene dicarboxylic acid and the like; alicyclic dicarboxylic acid such as hexahydroterephthalic acid, hexahydroisophthalic acid and the like; and aliphatic dicarboxylic acid such as malonic acid, succinic acid, adipic acid, azelaic acid, sebacic acid and the like. The glycol unit consists of one type, or two or more types selected from: aliphatic glycol such as ethylene glycol, propylene glycol, tetramethylene glycol, pentamethylene glycol, hexamethylene glycol, decamethylene glycol, neopentyl glycol, diethylene glycol and the like; alicyclic glycol such as 1,1.cyclohexanedimethylol, 1,4.cyclohexanedimethylol and the like; and aromatic glycol such as 4,4'.dihydroxybiphenyl, 2,2.bis(4'.hydroxyphenyl) propane, 2,2.bis(4'. . . hydroxyethoxyphenyl)propane, bis (4.hydroxyphenyl ) sulfone, bis(4. . .hydroxyethoxyphenyl) sulfonic acid and the like. In addition, the resin may consist of one type or two or more types selected from, for example, hydroxycarboxylic acid or alkoxycarboxylic acid such as p.hydroxybenzoic acid, p . . . hydroxyethoxybenzoic acid and the like. Representative examples of polyester resin include polyethylene terephthalate resin. This resin is a condensation polymer of dicarboxylic acid unit having terepshthalic acid or the alkyl (about 1 to 4 of carbon number) ester as a main component and glycol unit having ethylene glycol as a main component.

Examples of the polycarbonate resin include aromatic polycarbonate resin prepared by reacting aromatic hydroxyl compound and optionally a small amount of polyhydroxy compound with phosgene or diester of carbonic acid.

Examples of the aromatic hydroxyl compounds include 2,2.bis(4.hydroxyphenyl)propane(=bisphenol A), tetramethylbisphenol A, bis(4.hydroxyphenyl).p.diisopropylbenzene, hydroquinone, resorcinol, 4,4.dihydroxydiphenyl and the like, and preferably bisphenol A. In addition, for the purpose of further improving flame-retardant property, a compound obtained by binding the above-mentioned aromatic dihydroxyl compound with one or more sulfonic acid tetraalkyl phosphonium can be used. In order to obtain branched aromatic polycarbonate resin, polyhydroxyl compound such as phloroglucinol, 4,6.dimethyl.2,4,6.tri (4.hydroxyphenyl) heptene.2,4,6.dimethyl .2,4,6.tri (4.hydroxyphenyl)heptane, 2,6.dimethyl.2,4,6.tri (4.hydroxyphenyl)heptene.3, 1,3,5.tri (4.hydroxyphenyl)benzene, 1,1,1.tri(4.hydroxyphenyl) ethane; or 3,3.bis(4.hydroxyaryl)oxyindol(= isatinbisphenol), 5.chloroisatin, 5,7.dichloroisatin, 5.bromoisatin or the like, may be used as a part of the mentioned aromatic dihydroxyl compound. The polycarbonate resin is preferably polycarbonate resin derived from 2,2.bis (4.hydroxyphenyl)propane, orpolycarbonate copolymer derived from 2,2.bis(4.hydroxyphenyl)propane with other aromatic dihydroxyl compound. Furthermore, polymer or oligomer having a siloxane structure can be subjected to co-polymerization for the purpose of improving flame-retardant property.

Examples of the polyamide resins include lactam having a three-membered ring or more, polymerizable . . amino acid, or polyamide obtained by polycondensation of, for example, dibasic acidanddiamine. Examples of the lactam having a three-membered ring or more and polymerizable. . amino acid include. .caprolactam, aminocaproic acid, enanthlactam, 7.aminoheptanoic acid, 11.aminoundecanic acid, 9.aminononanoic acid, . .pyrrolidone, ..piperidone and the like. Examples of diamine include hexamethylenediamine, nonamethylenediamine, undecamethylenediamine, dodecamethylenediamine, met-axylylenediamine or the like. Examples of dicarboxylic acid include terephthalic acid, isophthalic acid, adipic acid, sebacic acid, dodecan dibasic acid, glutaric acid or the like. Examples of the polyamide resin include polyamide polymer and polyamide copolymer; for example, nylon 4, nylon 6, nylon 7, nylon 8, nylon 11, nylon 12, nylon 6–6, nylon 6–9, nylon 6–10, nylon 6–11, nylon 6–12, nylon 6T, copolymer nylon 6/6–6, copolymer nylon 6/12, copolymer nylon 6/6T, copolymer nylon 6I/6T or the like, and preferably nylon 6, nylon 6–6, copolymer nylon 6/6–6 and the like. Two or more types of polyamide resins may be used.

Examples of polyoxymethylene resin include a polymer having oxymethylene group (.CH$_2$O.) as a main structural unit. Examples include polyoxymethylene homopolymer or copolymer, terpolymer or block copolymer containing a small amount of other structural unit other than oxymethylene group. The polymer molecule may have linear, branched or cross-linked structure.

The polyphenylene ether resin is homopolymer or copolymer having, as a main component, phenyleneoxy group optionally having a substituent on the benzene ring. Examples of the substituent on the benzene ring include primary or secondary alkyl group, aryl group, aminoalkyl group, hydrocarbon oxy group or the like, and the degree of polymerization is not particularly limited but usually 10 or higher. One example of homopolymer of polyphenylene ether is that composed of 2,6.dimethyl. 1,4.phenylene ether unit. Examples of copolymer include a random copolymer which is composed of the above-mentioned unit and 2,3, 6.trimethyl. 1,4.phenylene ether unit. Also, a modified polyphenylene ether such as an alloy of polyphenylene ether and polystyrene based resin may be used.

Examples of polyolefin resin include polyolefin having ethylene component and/or propylene component as a main structural component; for example, homopolymer such as polyethylene, polypropylene or the like, and copolymer such as ethylene, propylene copolymer, ethylene.1-butene copolymer, ethylene, vinyl acetate copolymer, ethylene, acrylic acid copolymer, ethylene, ethyl acrylate copolymer, ethylene, sodium acrylate copolymer or the like.

Examples of polystyrene based resin include any styrene based resin having a styrene unit as a main component, such as polystyrene, rubbery reinforced polystyrene (High impact polystyrene, HI-PS), styrene-acrylonitrile copolymer, ABS resin and MBS resin.

Examples of the polyphenylene sulfide (PPS) resin include polyphenylene sulfide resin composed of 70 mol % or higher, preferably 90 mol % or higher of paraphenylene sulfide structure.

(b) Additives for Resin

The term "additives for resin" used herein refers to rubber components to be added to the raw material resins, as well as various types of additives.

The rubber components include core shell type rubbers as well as ethylene/ethylacrylate rubber, styrene, ethylene/butylene, styrene block copolymer (SEBS), styrene, ethylene/propylene, styrene block copolymer (SEPS) or the like. One type of these rubber components may be used alone, or two or more types may be used in combination.

The additives to be added to the raw material resins include, for example, antioxidant, UV absorber, release agent, lubricant, colorant, flame-retardant agent, filler or the like. One type of the additives for resin may be used alone or two or more types of the additives may be used in combination.

Preferred examples of the antioxidant include hindered phenol-based stabilizer, phosphite-based stabilizer, thioether-based stabilizer or the like.

The flame-retardant agents include halogen compound, inorganic phosphorus compound such as red phosphorus, organic phosphorus compound such as phosphoric ester, nitrogen containing compound such as melamine compound and the like. The halogen compound includes brominated phenoxy compound, pentabromobenzyl polyacrylate, brominated polycarbonate oligomer, brominated polystyrene or the like. When the halogen compound is used, it is preferred to use an antimony compound in combination because the antimony compound can improve the flame-retardant property. The antimony compound includes antimony trioxide, antimony tetraoxide, sodium antimony pentaoxide and the like. It is also preferred that high molecular weight polytetrafluoroethylene, asbestos, or phenolic novolac resin is added as anti-dropping agent.

Examples of the fillers include various forms such as fibrous, granular, powdery or plate form of inorganic fillers including glass fiber, carbon fiber, potassium titanate fiber, gypsum fiber, stainless steel fiber, aramid fiber, fibrous liquid crystal polymer, mica, talc, silica, calcium carbonate, glass bead, glass flake, clay, wollastonite, bariumsulfate, zinc oxide, titanium oxide, zinc borate, zinc sulfide or the like.

The types of UV absorber, release agent, lubricant, and colorant are not particularly limited, and are suitably selected by those skilled in the art.

(c) A pulverized Material of a Recovered Molded Article Generated at the Time of Molding of a Raw Material Resin Composition Comprising (a) a Raw Material Resin and (b) at Least One Kind of Additives for Resin and/or a Recycled Resin Composition Comprising (a) a Raw Material Resin and (b) at Least One Kind of Additives for Resin The term "pulverized material" used herein refers to a pulverized material of a recovered molded article generated at the time of molding of a raw material resin composition comprising (a) a raw material resin and (b) at least one kind of additives for resin and/or a recycled resin composition comprising (a) a raw material resin and (b) at least one kind of additives for resin.

The term "raw material resin composition" used herein refers to a resin composition composed of (a) the raw material resin (i.e., unmolded (virgin) resin) and (b) the additives for resin as mentioned above.

The term "the recycled resin composition" used herein refers to a resin composition containing at least partly a pulverized material of molded articles (concretely, recovered molded articles such as sprues, runners or any molded products which does not satisfy specifications (off specifications)) which have been subjected to at least one or more times of molding process. The recycled resin composition refers to a resin composition obtained by blending a predetermined amount of "a pulverized material of a recovered molded article generated at the time of molding of a raw material resin composition and/or a recycled resin composition" with a raw material resin composition, and then compounding the mixture.

The pulverized material used in the invention are obtained by pulverizing molded products which does not satisfy specifications (off specifications)(i.e., recovered molded articles) such as (1) sprues (a mold material solidified at the feed channel, through which molten material is fed to a gate or a runner in a mold for the injection or transfer molding), runners (mold material solidified on the distribution channel in a multi cavity mold for injection or transfer molding), or any molded products which does not satisfy specifications (off specifications), which are generated at the time of producing molded products by injection molding utilizing the above-mentioned raw material resin composition and/or recycled resin composition; (2) edges on both sides (deckle edges) generated at the time of producing molded products by extrusion molding; or (3) flash or fin generated at the time of producing molded products by injection molding or compression molding. In the present invention, these pulverized materials are not pelletized.

The pulverized materials are not pelletized because pelletizing of the pulverized materials (where the products subjected to pelletizing are called "pelletized recycled products") causes the number of thermal treatment to increase due to melting and mixing processes for pelletization, thus to cause unfavorably thermal decomposition, degeneration during the mixing process, changes of properties or the like.

The recycled resin composition of the present invention is obtained by compounding a mixture containing the above-mentioned (a) a raw material resin, (b) at least one additive for resin, and (c) a pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin.

The term "compounding" is used herein in a broad sense as meaning an operation of adding and mixing homogeneously a raw material resin, at least one kind of additives for resin, and a pulverized material of a recovered molded article. Depending on resin types and purposes, the process maybe suitably carried out. For example, the additives for resin and a pulverized material of a recovered molded article may be added to solid or liquid resin and the mixture may be mechanically stirred at an ambient or increased temperature with or without heating. Alternatively, a resin in a melting state may be mixed and kneaded by heating with the additives for resin and a pulverized material. In the present invention, it is preferred that a raw material resin, additives for resin and a pulverized material of a recovered molded article are homogeneously mixed and the resultant mixture is melt and kneaded to be homogeneous.

It is preferred that the resin composition of the present invention is produced by mixing, melting and kneading evenly the raw material resin, additives for resin and a pulverized material of a recovered molded article in extruder and the like as mentioned above, and extruding the mixture and cutting it into pellet form.

The recycled resin composition is recycled, for example, as shown in FIG. 1 (a flowchart showing one example of production of the recycled resin composition of the present invention).

What is called as a recycled resin composition (first time) is given by compounding a raw material resin and additives for resin with a pulverized material (1) of are covered molded article such as sprues or runners generated at the time of producing molded products from raw material resin composition obtained by blending a raw material resin and additives for resin; what is called as a recycled resin composition (second time) is given by compounding a raw material resin and additives for resin with a pulverized material (2) of a recovered molded article such as sprues or runners generated at the time of producing molded products from the recycled resin composition (first time); and what is called as a recycled resin composition (third time) is given by compounding a raw material resin and additives for resin with a pulverized material (3) of a recovered molded article such as sprues or runners generated at the time of producing molded products from the recycled resin composition (second time).

As mentioned above, a composition given by compounding the raw material resin, additives for resin, and a pulverized material (N) of a recovered molded article is called a recycled resin composition of N time (where N is an integer), and a composition given by compounding the raw material resin and additives for resin with a pulverized material (N+1) of a recovered molded article such as sprues or runners generated at the time of producing molded products from the recycled resin composition of N time is called as a recycled resin composition of (N+1) time. In order to produce the recycled resin composition of (N+1) time, not only the pulverized material (N) of are covered molded article such as sprues or runners generated at the time of producing the molded products from the recycled resin composition of N time, but also one or two or more any pulverized materials (1) to (N) of a recovered molded article, can be used alone or in combination.

In a preferred embodiment of the present invention, the recycled resin composition of the invention has a composition substantially the same as that of (c) the pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin.

Similarly, in a preferred embodiment of the present invention, the raw material resin composition composed of (a) a raw material resin and (b) at least one kind of the additives for resin has a composition substantially the same as that of (c) the pulverized material of a recovered molded article generated at the time of molding of a raw material resin composition comprising (a) said raw material resin and (b) said at least one kind of additives for resin and/or a recycled resin composition comprising (a) said raw material resin and (b) said at least one kind of additives for resin.

In the recycled resin composition of the present invention, a mixing ratio of the pulverized material to the raw material resin and the additives for resin is 75 to 5 parts by weight of the pulverized material with respect to 25 to 95 parts by weight of the total amount of the raw material resin and the additives for resin, preferably, 60 to 10 parts by weight of the pulverized material with respect to 40 to 90 parts by weight of the total amount of the raw material resin and the additives for resin. It is not preferred that the amount of the pulverized material in the recycled resin composition is over 75 parts by weight, since the products suffer from degradation of the physical properties and also a feeding property to the molding apparatus as well as a moldability during the compounding (kneading) process become inferior. On the other hand, when the amount of the pulverized material is less than 5 parts by weight, the object of the present invention where pulverized materials are reused, is not fully achieved.

A particle size of the pulverized material to be blended in the recycled resin composition of the present invention is preferably 0.1 to 50 mm, more preferably 0.2 to 30 mm, and even more preferably 0.3 to 25 mm. The particle size of the pulverized material referred herein means a maximum value of a diameter distance obtained by measuring a length between two points on one piece of the pulverized material. When the particle size is over 50 mm, it becomes difficult to evenly mix the material with other resins during the production process of the recycled resin composition, and the resultant recycled resin composition becomes inhomogeneous, and also the operation of the apparatus for production becomes difficult. As for the recycled resin composition containing fillers such as glass fiber or the like, the particle size of the pulverized material is preferably 0.5 to 50 mm, more preferably 0.7 to 30 mm, and even more preferably 1 to 25 mm. In the case of containing the filler, the filler is finely pulverized when the size of the particle is 0.5 mm or less. As a result, the molded product made from the recycled resin composition containing such a pulverized material tends to have less strength. In order to adjust the particle size of the pulverized material in a preferred range, it is preferred that a pulverized material is mixed with a recycled resin material after subjected to process by a classifier such as sieve or the like.

The recycled resin composition of the present invention can be produced by a method where a predetermined amount of the raw material resin, the additives for resin and the pulverized material are respectively weighed, and are mixed by any mixing machines such as a blender, mixer, tumbler or the like, and then subjected to melting, kneading, and extruding in an extruder or the like, and cutting in pelletizer or mill, so that the mixture is pelletized, granulated or powdered. In the case of pelletizing through the melting and kneading processes, the pulverized materials can be fed into the side feeding hole of the extruder in order to prevent the pulverized materials from thermal decomposition, deterioration, and changes of properties. In the case where the recycled resin composition finally obtained is to be further blended with the flame-retardant agent or fillers, these additives may be fed into the side feeding hole of the extruder. An extruder used in the present invention may be any type of an single-screw extruder or a twin-screw extruder equipping a vent hole.

The recycled resin composition of the present invention may be used for producing products or parts (molded products) by any conventionally known molding processes as molding process for thermoplastic resin compositions, for example, injection molding, extrusion, compression molding or the like. Among these molding process, injection molding is especially preferred. Examples of final products or parts include parts of industrial electrical equipment, parts of home electrical appliances, parts of optical instruments, parts of daily necessaries, or the like.

The molded product obtained from the recycled resin composition of the present invention is excellent in physical property, flame-retardant property or the like as compared with the molded product obtained from the mixture of pelletized recycled material of the pulverized materials, raw material resin pellets and additives for resin. In most cases, the performance of the molded product obtained from the recycled resin composition of the present invention is substantially the same as that obtained only from the raw material resin composition. Even if mechanical properties are degraded, tensile strength of the molded product, for example, is 80% or higher of that of the molded product obtained only from the raw material resin composition. In addition, as for combustive property of the recycled resin composition of the present invention, flame-retardant property (flame class) prescribed by UL94 of molded products is substantially the same as that of the raw material resin composition, when the content of flame-retardant is equal in both cases. On the other hand, in the molded product obtained from the resin composition blended with a large amount of re-pelletized pulverized materials, the flame-retardant property is lowered; for example, dropping material easily ignites a cotton indicator in vertical burning test.

The present invention will be hereinafter described by referring the foregoing examples, but these examples illustrate just exemplifications of the present invention. It is obvious for those skilled in the art that any change, modification or improvement can be made on the examples without departing from the spirit of the present invention, and therefore the scope of the invention is not limited by the foregoing examples.

EXAMPLES

As for the following examples, evaluation tests of respective physical properties were carried out according to the following methods.
(1) Breaking strength (Mpa or kg/cm$^2$), elongation at break (%): measured according to JIS K7113 (1981).
(2) Flexural strength (Mpa or kg/cm$^2$), flexural modulus in elasticity (Gpa or kg/cm$^2$): measured according to JIS K7171 (1994).
(3) Izod impact strength value (J/m or kgf.cm/cm): measured on test pieces having a thickness of 3.2 mm (⅛ inch) and 12.7 mm (½ inch) and having notches of 0.25 R according to JIS K7110 (1984).

(4) Flammability (UL94): measured on UL standard test pieces having a thickness of 1.6 mm by conducting vertical burning tests. V0 and V2 refer to V0 pass and V2 pass respectively.

Referential Example 1

The raw material resin composition used in the following examples, referential example and comparative example have a standard composition of 100 parts by weight of pellets of unmolded polybutylene terephthalate (PBT resin), 18 parts by weight of brominated epoxy resin, 9 parts by weight of antimony oxide, and 54 parts by weight of glass fiber. These four components were respectively weighed, and the three components other than glass fiber were mixed in blender and were fed into the main feeding hole of the twin-screw extruder equipping a vacuum vent hole for kneading process. The glass fiber was fed into side feeding hole. The mixture was then subjected to melting and kneading processes. The strand extruded from a die provided at the tip of the extruder was cooled down and then cut by a cutter to prepare pellets of the raw material resin composition. Tests pieces were prepared from the raw material resin composition pellets and were used for measuring respective physical properties. The results are shown in Table 1.

Example 1

The pellets of the raw material resin composition obtained by the method described in Referential example 1 were used as raw material for producing molded products using an test mold by injection molding, and the molded products were pulverized to prepare pulverized materials (1). The pulverized materials were passed through a sieve of 16 meshes of ASTM to remove fine particles. The pulverized materials having a maximum length of 50 mm or more were removed by visual inspection. Among the thus obtained pulverized material, 10 pulverized materials were chosen at random and the maximum lengths thereof were determined. The average value was 23 mm. Then, 78 parts by weight of the pulverized materials (1), 100 parts by weight of pellets of unmolded polybutylene terephthalate (PBT resin), 18 parts by weight of brominated epoxy resin, 9 parts by weight of antimony oxide, and 54 parts by weight of glass fiber (these four components hereinafter referred to as "additional four components") were respectively weighed. The additional four components other than glass fiber were mixed in blender and were fed into the main feeding hole of the twin-screw extruder equipping a vacuum vent hole for kneading process. The glass fiber was fed into a side feeding hole and was added to the melted resin, and the mixture was then subjected to the melting and kneading processes to obtain a pelletized recycled resin composition (first time) containing 30% by weight of the pulverized materials. Tests pieces were prepared from the thus-obtained recycled resin composition (first time) and were used for measuring respective physical properties. The results are shown in Table 1.

Example 2, Example 3

The recycled resin composition (third time) (Example 2) and the recycled resin composition (fifth times) (Example 3) were prepared by using the pellets of the raw material resin composition and the additional four components described in Example 1 according to the procedure shown in FIG. 1. Tests pieces were prepared from the thus obtained recycled resin composition (third time) and the recycled resin composition (fifth time) and were used for measuring respective physical properties. The results are shown in Table 1.

Comparative Example 1

The pellets of the raw material resin composition obtained by the method described in Referential example 1 were used as raw material for producing molded products using a test mold by injection molding, and the molded products were pulverized to prepare pulverized materials (1). The pulverized materials (1) were fed into the main feeding hole of the twin-screw extruder equipping a vacuum vent hole and were kneaded for palletization to obtain pelletized recycled products. 70 parts by weight of the pellets of raw material resin composition were mixed with 30 parts by weight of the pelletized recycled products. Test pieces were made from the mixture and were used for measuring respective physical properties. The results are shown in Table 1.

TABLE 1

| | Number | | | | |
|---|---|---|---|---|---|
| | Examples | | | Referential | Comparative |
| Items | 1 | 2 | 3 | example 1 | example 1 |
| Breaking strength | | | | | |
| (kg/cm$^2$) | 1260 | 1220 | 1290 | 1220 | 1120 |
| (Mpa) | 123 | 120 | 126 | 120 | 110 |
| Elongation at break (%) | 4.1 | 4.0 | 3.5 | 4.1 | 3.9 |
| Flexural strength | | | | | |
| (kg/cm$^2$) | 1910 | 1840 | 1930 | 1990 | 1830 |
| (Mpa) | 187 | 180 | 189 | 195 | 179 |
| Flexural Modulus in elasticity | | | | | |
| (kg/cm$^2$) | 94700 | 92700 | 94200 | 94900 | 92500 |
| (Gpa) | 9.3 | 9.1 | 9.2 | 9.3 | 9.1 |
| 1/8 in. Izod impact strength value | | | | | |
| (kgf · cm/cm) | 7.1 | 6.8 | 7.0 | 6.7 | 5.6 |
| (J/m) | 70 | 67 | 69 | 66 | 55 |
| 1/2 in. Izod impact strength value | | | | | |
| (kgf · cm/cm) | 6.1 | 6.3 | 6.4 | 5.7 | 4.8 |
| (J/m) | 60 | 62 | 63 | 56 | 47 |
| Flammability (UL 94) | V0 | V0 | V0 | V0 | V2 |
| Number of recycling times of pulverized materials (times) | One | Three | Five | Raw material resin composition | Pelletized recycled product |

The followings results are clearly understood from Table 1.

(1) The physical properties of the recycled resin composition of the present invention are substantially the same as those of the molded product from the raw material resin composition (Referential example 1) even if the number of recycle times of the pulverized material is increased, that is, one time (Example 1), three times (Example 2), and five times (Example 3), because these pulverized materials were blended with the raw material resin.

(2) On the other hand, it is observed that the a blend of a raw material resin composition pellet and a pelletized recycled product (Comparative example 1) suffers from degradations of respective physical properties as well as degradation of flame-retardant property.

The recycled resin composition of the present invention achieves especially advantageous effects described below, and its industrial applicability is extremely high.

(1) In spite of having a high content of the pulverized materials, the recycled resin composition of the present invention can provide excellent molded products having strength, flame-retardant property, molding property or the like which are substantially the same as those of the molded products molded only from raw material resin composition, because the pulverized materials are blended with the raw material resin.

(2) The recycled resin composition of the present invention can effectively utilize pulverized materials such as sprues and runners, and the amount of the resin to be discarded can be reduced and a yield efficiency with respect to the raw material resin can be increased.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An injection molded product produced by injection molding a recycled resin composition obtained by compounding a mixture containing (a) a raw material resin, (b) at least one additive for resin, and (c) a pulverized material of a recovered injection-molded article generated at the time of injection molding a raw material resin composition;
   wherein (c) the pulverized material of a recovered injection-molded article generated at the time of injection molding of a raw material resin composition consists of the same ingredients (a) and (b) in substantially the same proportions as in the recycled resin composition; and
   wherein the raw material resin composition comprises (i) a raw material resin and (ii) at least one additive for resin; or (i) a raw material resin, (ii) at least one additive for resin, and (iii) at least one previously recycled resin composition.

2. The injection molded product produced by injection molding a recycled resin composition according to claim 1, wherein the recycled resin composition is in a pelletized faint which is obtained by compounding the mixture in an extruder and cutting the mixture.

3. The injection molded product produced by injection molding a recycled resin composition according to claim 1, wherein a raw material resin composition composed of (a) the raw material resin and (b) the at least one additive for resin has a composition substantially the issue as that of (c) the pulverized material of a recovered molded article generated at the time of molding of a raw material resin composition comprising (a) said raw material resin and (b) said at least one additive for resin and/or a recycled resin composition comprising (a) said raw material resin and (b) said at least one additive for resin.

4. The injection molded product produced by injection molding a recycled resin composition according to claim 1, wherein the recycled resin composition is obtained by compounding the mixture containing 25 to 95 parts by weight of a total amount of (a) the raw material rosin and (b) the at least one additive for resin, and 75 to 5 pints by weight of (c) the pulverized material of a recovered molded article generated at the time of molding of a raw material resin composition comprising (a) said raw material resin and (b) said at least one additive for resin and/or a recycled resin composition comprising (a) said raw material resin and (b) said at lent one additive for rosin.

5. The injection molded product produced by injection molding a recycled resin composition according to claim 1, wherein (a) the raw material resin is one resin or a mixture of two or more resins which are selected from a group consisting of polyester resin, polycarbonate resin, polyamide resin, polyoxymethylene resin, polyphenylene ether resin, polyolefin resin, polystyrene resin, and polyphenylene sulfide resin.

6. The injection molded product produced by injection molding a recycled resin composition according to claim 1, wherein the at least one additive for resin (b) comprises a glass fiber.

7. The injection molded product produced by injection molding a recycled resin composition according to claim 1, wherein (c) said pulverized material of a recovered molded article generated at the time of molding of a raw material resin composition comprising (a) said raw material resin and (b) said at least one additive for resin and/or a recycled resin composition comprising (a) said raw material resin and (b) said at least one additive tot resin, has a particle size of 0.1 to 50 mm.

8. The injection molded product produced by injection molding a recycled resin composition according to claim 6, wherein (c) said pulverized material of a recovered molded article generated at the time of molding of a raw material resin composition comprising (a) said raw material resin and (b) said at least one additive for resin and/or a recycled resin composition comprising (a) and raw material resin and (b) said at least one additive for resin, has a particle size of 0.5 to 50 mm.

9. The injection molded product produced by injection molding a recycled resin composition according to claim 1, wherein a breaking strength of the injection mold product made from the recycled resin composition is 80% or higher of that of a molded product made from the raw material resin composition.

10. The injection molded product produced by injection molding a recycled resin composition according to claim 1, wherein an elongation at break of the injection molded product made from the recycled resin composition is 80% or higher of that of a molded product made from the raw material resin composition.

11. The injection molded product produced by injection molding a recycled resin composition according to claim 1, wherein a flexural strength of the injection molded product made front the recycled resin composition is 80% or higher of that of a molded product made from the raw material main composition.

12. The injection molded product produced by injection molding a recycled resin composition according to claim 1, wherein a flexural modulus in elasticity of the injection molded product made from the recycled resin composition is 80% or higher of that of a molded product made from die raw material resin composition.

13. The injection molded product produced by injection molding a recycled resin composition according to claim 1, wherein a flammability (Flame class), prescribed in UL 94, of the injection molded product made from the recycled resin composition is substantially similar to that of a molded product made from the raw material resin composition.

14. A method for producing the injection molded product according to claim 1, which comprises the stops of compounding the mixture containing (a) a raw material resin, (b) the at least one additive for resin, and (c) a pulverized material of a recovered molded article generated at the time of molding of a raw material resin composition comprising (a) said raw material resin and (b) said at least one additive for resin and/or a recycled resin composition comprising(a) said raw material resin and (b) said at least one additive for resin, and injection molding the mixture.

15. The method according to claim 14, wherein the recycled resin composition has a composition substantially the same as that of (c) the pulverized material of a recovered molded article generated at the time of molding of a raw material resin composition comprising (a) said raw material resin and (b) aid at least one additive for resin and/or a recycled resin composition comprising (a) said raw material resin and (b) maid at least one additive for resin.

16. The method according to claim 14, wherein a raw material resin composition composed of (a) the raw material resin and (b) the at least one additive for resin has a composition substantially the same as that of (c) the pulverized material of a recovered molded snide generated at the dine of molding of a raw material resin composition comprising (a) said raw material resin and (b) said at least one additive for resin and/or a recycled resin composition comprising (a) said raw material resin and (b) said at least one additive for rosin.

17. A method for recycling a resin which comprises the steps of: collecting (c) a pulverized material of a recovered molded article generated at the time of molding of a raw material resin composition comprising (a) aid raw material resin sad (b) said at least one additive for resin and/or a recycled resin composition comprising (a) said raw material resin and (b) said at least one additive for resin, and compounding a mixture containing (a) a raw material resin, (b) the at least one additive for resin, and (c) the thus recovered pulverized material to produce a recycled resin composition.

18. An injection molded product obtained by injection molding a pelletized recycled resin composition which comprises (a) a raw material resin, (b) at least one additive for resin, and (c) a pulverized material of a recovered molded article generated at the time of injection molding a raw material resin composition, wherein the pelletized recycled resin composition lint composition substantially the same as that of (c) the pulverized material of a recovered molded article generated at the time of injection molding of a raw material resin composition, and wherein the pelletized recycled resin composition is obtained by mixing (a) the raw material resin, (b) the at least one additive for resin, and (c) the pulverized material obtained by pulverizing recovered molded articles generated at the time of injection molding a raw material resin composition wherein said pulverized material is not separately subjected to pelletizing and wherein said raw material composition comprises (i) a raw material resin and (ii) at least one additive for resin; or (i) a raw material main, (ii) at least one additive for resin, and (iii) at least one of previously recycled resin compositions, to form a mixture;

subjecting the mixture to melting and kneading to obtain a pelletized recycled resin composition; and injection molding the recycled resin composition to form the injection molded product.

19. A method for making a recycled injection molded product comprising:

(1) obtaining a mixture containing (a) a raw material resin, (b) at least one additive for resin, and (c) a pulverized material of a recovered molded article generated at the time of injection molding a raw material resin composition, wherein the recycled resin composition has a composition substantially the same as that of (c) the pulverized material of a recovered molded article generated at the time of injection molding of a raw material resin composition, and wherein the raw material resin composition comprises (i) a raw material resin and (ii) at least one additive for resin; or (i) a raw material resin, (ii) at least one additive for resin, and (iii) at least one previously recycled resin composition;

(2) subjecting the mixture to melting and kneading to obtain a pelletized recycled resin composition; and (3) injection molding the recycled resin composition to form the recycled injection molded product.

20. The recycled injection molded product obtained by the method of claim 19.

21. The recycled injection molded product of claim 20, wherein a breaking strength of the injection molded product made from the recycled resin composition is 80% or higher of that of a molded product made from a raw material resin composition.

22. The recycled injection molded product of claim 20, wherein an elongation at break of the injection molded product made from the recycled resin composition is 80% or higher of that of a molded product made from the raw material resin composition.

23. The recycled injection molded product of claim 20, wherein a flexural strength of the injection molded product made from the recycled resin composition is 80% or higher of that of a molded product made from the raw material resin composition.

24. The recycled injection molded product of claim 20, wherein a flammability (Flame class), prescribed in UL 94, of the injection molded product made from the recycled resin composition is substantially similar to that of a molded product made from the raw material resin composition.

* * * * *

UNITED STATES PATENT AND TRADEMARK OFFICE
CERTIFICATE OF CORRECTION

PATENT NO.    : 6,723,759 B2
DATED         : April 20, 2004
INVENTOR(S)   : Kunihiro Takenaka et al.

It is certified that error appears in the above-identified patent and that said Letters Patent is hereby corrected as shown below:

<u>Columns 13-16,</u>
Claims 3, 4, 7, 9, 11, 12, 14, 15, 16, 17 and 18, should read as follows:

3. The injection molded product produced by injection molding a recycled resin composition according to claim 1, wherein a raw material resin composition composed of (a) the raw material resin and (b) the at least one additive for resin has a composition substantially the same as that of (c) the pulverized material of a recovered molded article generated at the time of molding of a raw material resin composition comprising (a) said raw material resin and (b) said at least one additive for resin and/or a recycled resin composition comprising (a) said raw material resin and (b) said at least one additive for resin.

4. The injection molded product produced by injection molding a recycled resin composition according to claim 1, wherein the recycled resin composition is obtained by compounding the mixture containing 25 to 95 parts by weight of a total amount of (a) the raw material rosin and (b) the at least one additive for resin, and 75 to 5 parts by weight of (c) the pulverized material of a recovered molded article generated at the time of molding of a raw material resin composition comprising (a) said raw material resin and (b) said at least one additive for resin and/or a recycled resin composition comprising (a) said raw material resin and (b) said at least one additive for resin and/or a recycled resin composition (a) said raw material resin and (b) said at least one additive for resin.

7. The injection molded product produced by injection molding a recycled resin composition according to claim 1, wherein (c) said pulverized material of a recovered molded article generated at the time of molding of a raw material resin composition comprising (a) said raw material resin and (b) said at least one additive for resin and/or a recycled resin composition comprising (a) said raw material resin and (b) said at least one additive tot-for resin, has a particle size of 0.1 to 50 mm.

9. The injection molded product produced by injection molding a recycled resin composition according to claim 1, wherein a breaking strength of the injection molded product made from the recycled resin composition is 80% or higher of that of a molded product made from the raw material resin composition.

11. The injection molded product produced by injection molding a recycled resin composition according to claim 1, wherein a flexural strength of the injection molded product made front from the recycled resin composition is 80% or higher of that of a molded product made from the raw material resin composition.

UNITED STATES PATENT AND TRADEMARK OFFICE
CERTIFICATE OF CORRECTION

PATENT NO. : 6,723,759 B2
DATED : April 20, 2004
INVENTOR(S) : Kunihiro Takenaka et al.

It is certified that error appears in the above-identified patent and that said Letters Patent is hereby corrected as shown below:

12. The injection molded product produced by injection molding a recycled resin composition according to claim 1, wherein a flexural modulus in elasticity of the injection molded product made from the recycled resin composition is 80% or higher of that of a molded product made from die-the raw material resin composition.

14. A method for producing the injection molded product according to claim 1, which comprises the steps of compounding the mixture containing (a) a raw material resin, (b) the at least one additive for resin, and (c) a pulverized material of a recovered molded article generated at the time of molding of a raw material resin composition comprising (a) said raw material resin and (b) said at least one additive for resin and/or a recycled resin composition comprising (a) said raw material resin and (b) said at least one additive for resin, and injection molding the mixture.

15. The method according to claim 14, wherein the recycled resin composition has a composition substantially the same as that of (c) the pulverized material of a recovered molded article generated at the time of molding of a raw material resin composition comprising (a) said raw material resin and (b) aid-said at least one additive for resin and/or a recycled resin composition comprising (a) said raw material resin and (b) maid-said at least one additive for resin.

16. The method according to claim 14, wherein a raw material resin composition composed of (a) the raw material resin and (b) the at least one additive for resin has a composition substantially the same as that of (c) the pulverized material of a recovered molded article generated at the time of molding of a raw material resin composition comprising (a) said raw material resin and (b) said at least one additive for resin and/or a recycled resin composition comprising (a) said raw material resin and (b) said at least one additive for resin.

17. A method for recycling a resin which comprises the steps of: collecting (c) a pulverized material of a recovered molded article generated at the time of molding of a raw material resin composition comprising (a) aid-said raw material resin sad (b) said at least one additive for resin and/or a recycled resin composition comprising (a) said raw material resin and (b) said at least one additive for resin, and compounding a mixture containing (a) a raw material resin, (b) the at least one additive for resin, and (c) the thus recovered pulverized material to produce a recycled resin composition.

18. An injection molded product obtained by injection molding a pelletized recycled resin composition which comprises (a) a raw material resin, (b) at least one additive for resin, and (c) a pulverized material of a recovered molded article generated at the time of injection molding a raw material resin composition, wherein the pelletized recycled

UNITED STATES PATENT AND TRADEMARK OFFICE
CERTIFICATE OF CORRECTION

PATENT NO. : 6,723,759 B2
DATED : April 20, 2004
INVENTOR(S) : Kunihiro Takenaka et al.

It is certified that error appears in the above-identified patent and that said Letters Patent is hereby corrected as shown below:

18. An injection molded product obtained by injection molding a pelletized recycled resin composition which comprises (a) a raw material resin, (b) at least one additive for resin, and (c) a pulverized material of a recovered molded article generated at the time of injection molding a raw material resin composition, wherein the pelletized recycled resin composition lint-has a composition substantially the same as that of (c) the pulverized material of a recovered molded article generated at the time of injection molding of a raw material resin composition, and wherein the pelletized recycled resin composition is obtained by mixing (a) the raw material resin, (b) the at least one additive for resin, and (c) the pulverized material obtained by pulverizing recovered molded articles generated at the time of injection molding a raw material resin composition wherein said pulverized material is not separately subjected to pelletizing and wherein said raw material composition comprises (i) a raw material resin (ii) at least one additive for resin; and (iii) at least one of previously recycled resin compositions, to form a mixture;
subjecting the mixture to melting and kneading to obtain a pelletized recycled resin composition; and
injection molding the recycled resin composition to form the injection molded product.

Signed and Sealed this

Sixteenth Day of November, 2004

JON W. DUDAS
*Director of the United States Patent and Trademark Office*